Figure 1:
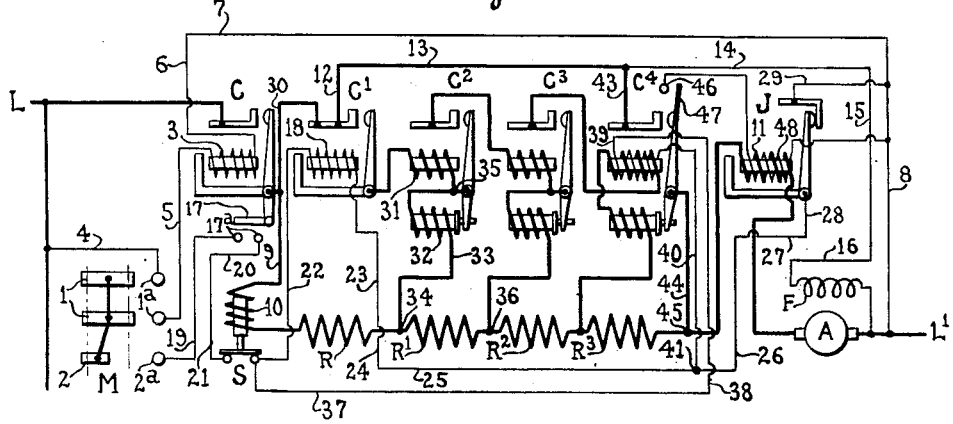

Nov. 4, 1924.

F. BERGMANN 1,513,958

ELECTRICAL RELAY

Filed March 16, 1921   2 Sheets-Sheet 1

INVENTOR.
Fedor Bergmann
BY
ATTORNEY

Nov. 4, 1924.                                                       1,513,958

F. BERGMANN
ELECTRICAL RELAY
Filed March 16, 1921           2 Sheets-Sheet 2

INVENTOR.
Fedor Bergmann
BY
Frank H Hubbard
ATTORNEYS.

Patented Nov. 4, 1924.

1,513,958

UNITED STATES PATENT OFFICE.

FEDOR BERGMANN, OF BEDFORD, ENGLAND.

ELECTRICAL RELAY.

Application filed March 16, 1921. Serial No. 452,654.

*To all whom it may concern:*

Be it known that I, FEDOR BERGMANN, a citizen of the Republic of Switzerland, and a resident of Bedford, in the county of Bedford, England, have invented certain new and useful Improvements in and Connected with Electrical Relays, of which the following is a specification.

This invention relates to electrical relays for use in association with controllers for electric-motors for operating capstans, winches and the like. It is very desirable to make provision for slowing down the motor on occurrence of an overload in excess of a predetermined amount, without, however, actually opening the circuit to the motor. The advantage of this is that even should the overload conditions be so severe as to stall the motor, the latter still exerts a driving torque, although the current taken by it from the supply mains is limited to a safe value. On the overload conditions ceasing, the motor is required to be automatically re-accelerated to its normal speed. Means are already known for accomplishing these results, such means usually consisting of a device of the nature of a series relay, used in conjunction with a contactor switch, or switches, for the purpose of re-inserting a part, or all, of the starting resistance in series with the motor armature.

A difficulty arises in such applications by reason of the fact that whereas the relay is desired to come into action on the occurrence of a current peak of a definite value when the motor is running, it must not operate during the period of acceleration. Now during acceleration of a motor from rest, considerable current peaks occur, peaks which are likely to be as great as, or greater than, that at which the relay is required to operate under running conditions, and it is therefore essential to provide some means for rendering the relay inoperative during such periods of acceleration.

According to my invention I provide a special form of relay, adapted to be used in such a manner in conjunction with the accelerating switches, that it is rendered unresponsive to the current peaks occurring during acceleration, while remaining sensitive during normal running to current peaks of equal, or even less, magnitude than those occurring during acceleration.

The invention consists broadly of a jamming relay having two coils one connected in series with the motor armature and the other connected in shunt to said motor armature said coils acting cumulatively. The invention further comprises means for preventing the energization of either or both of the coils until the motor has been started and accelerated and means for preventing the resetting of the relay until either the current or the motor speed has decreased to a predetermined limit. The shunt coil of the relay may itself be connected across the motor armature so as to be subject to the back electromotive force of the motor or a separate voltage relay may be connected across the motor armature as will hereafter appear.

Figure 2:
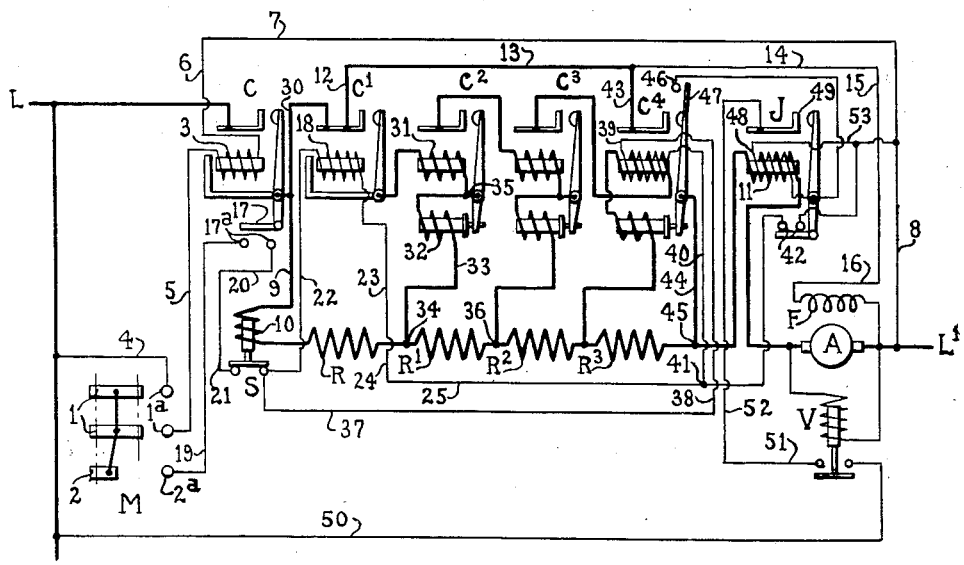
Figure 3:
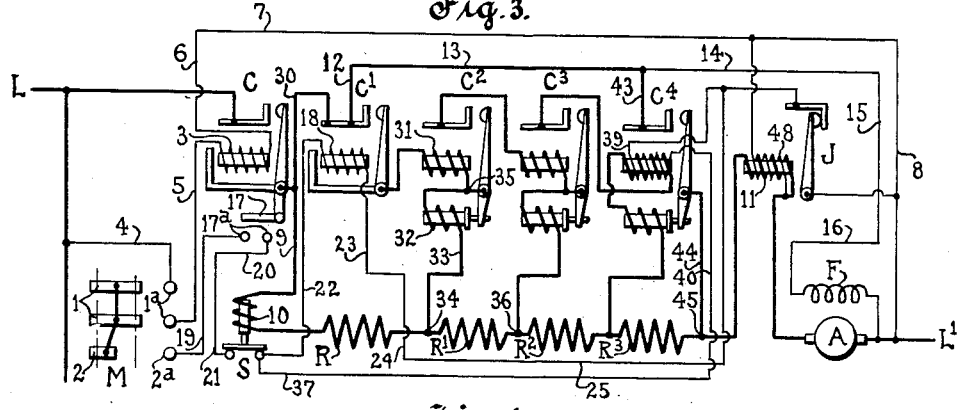
Figure 4:
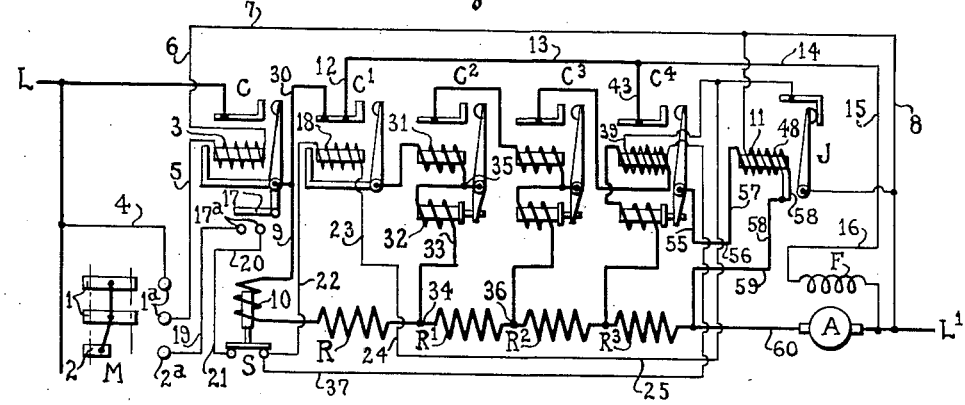
Figure 5:
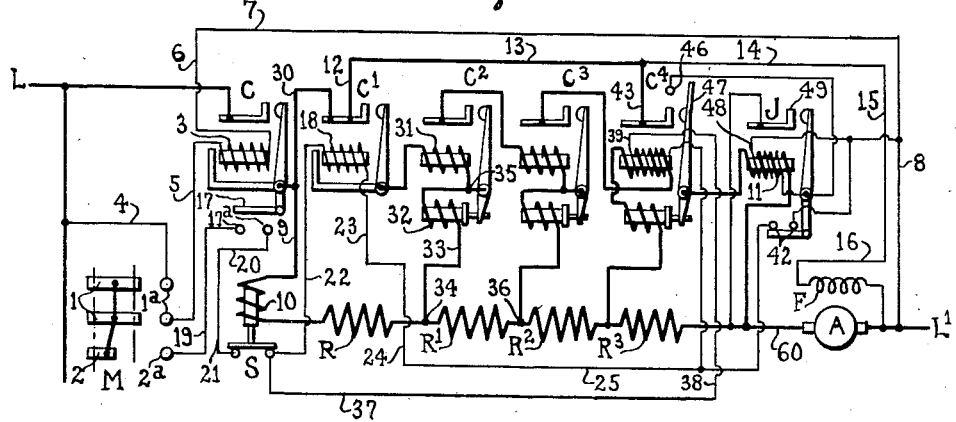

In the accompanying drawings I have illustrated the application of my invention, Figure 1 being a diagram illustrating one convenient arrangement for employing my special form of jamming relay. Fig. 2 is a similar view illustrating the use of the relay in combination with a voltage relay. Fig. 3 is a similar view wherein the shunt coil of my special jamming relay is connected across the motor armature so as to be subject to both current and voltage conditions. Fig. 4 illustrates a modification wherein the special jamming relay is only included in circuit at the end of the starting period, and Fig. 5 shows a further modified arrangement wherein neither of the coils is inserted in circuit until closure of the last accelerating switch.

Referring to these drawings and particularly to Fig. 1, A designates the motor armature and F the motor field. M is the master controller which is illustrated as of the drum type. R, $R^1$, $R^2$, and $R^3$, are the sections of a starting resistance, S is the series relay and J the special jamming relay having both shunt and series coils. C and $C^1$ are contactors operated by shunt coils, $C^2$ and $C^3$ are series lockout switches— which in the example shown are of the type described in the specification of British Patent No. 22,435 of 1914, to Barnum & Date,—while $C^4$ designates the last of the accelerating contactors which is provided with a special shunt winding as will hereafter appear. The arrangement and operation of the various elements is as follows:—

Upon movement of the master controller M to its first position contact is established between the moving contacts 1 and the stationary contacts 1ᵃ. This energizes the coil 3 of the contactor C the circuit thereof extending from line L by conductor 4 to the contacts 1 and 1ᵃ thence by conductor 5 through coil 3 of contactor C by conductors 6, 7, 8 to line L¹. Contactor C therefore closes and establishes circuit to the motor, current passing from line L through contactor switch C by conductor 9 through the coil 10 of the series relay S through the whole of the resistance sections R—R³ through the series coil 11 of jamming relay J to and through the motor armature to line L¹ while the field circuit of the motor can be traced from line L to the contacts of contactor C by conductors 30, 12, 13, 14, 15 and 16 through the field F to line L¹. The rush of current through the coil 10 of the series relay S lifts the armature of the series relay S as will be well understood and upon the current dying down as the motor accelerates to its first speed, the armature of the series relay S drops again and the motor continues to run at its first or lowest speed. Closure of contactor C has closed the auxiliary contacts indicated at 17 and 17ᵃ and upon movement of master controller M to second position circuit is established to the coil 18 of contactor C¹ subject to control by the series relay S in manner well understood. The circuit for this coil 18 can be readily traced from line L to and through contacts 2 and 2ᵃ of the master controller M by conductor 19, through auxiliary contacts 17—17ᵃ of contactor C, by conductors 20 and 21 through contacts of the series relay S by conductor 22, through the coil 18, by conductors 23, 24, 25, 26, 27 and 28, through the closed contacts of jamming relay J by conductors 29 and 8 to line L¹. A circuit is also established through the shunt coil of contactor switch C⁴ which can be traced from line L to the contacts of series relay S as before and thence by conductors 37, 38 and 39 through the said shunt coil of switch C⁴ by conductor 40 to the point 41 and thence as before described through the arm and contacts of the jamming relay J to line L¹.

Assuming current conditions to be normal so that no interference is experienced from the operation of series relay S contactor C¹ responds and the first section R of the resistance is short circuited, the series current now passing from line L through the contacts and arm of contactor C by conductor 30 to and through the contacts and switch arm of contactor C¹ through the coils 31 and 32 of the first, C², of the series lockout switches by conductor 33 to the point 34 of the resistance and thence as before through the remaining sections of the resistance the series coil 11 of the jamming relay J and the motor armature.

Contactor lockout switch C² now responds, subject, of course to current conditions as will be well understood, and the second section R¹ of the resistance will now be short circuited the current passing from the point 35 of lockout switch C² through the arm and contacts of the switch and thence through the coils of the lockout switch C³ to the point 36 of the resistance and thence as before through the motor armature to line L¹. Response of lockout switch C³ cuts out resistance section R² and establishes circuit through the series coils of the last accelerating contactors C⁴ as will be readily seen upon reference to the drawing.

Contactor switch C⁴ thereupon responds, subject to current conditions, and the whole of the resistance sections are short circuited, the current now being able to pass direct from the stationary contact of switch C¹ by conductors 13 and 43 through the contacts and arm of contactor switch C⁴ by conductor 44 to the point 45 and thence through the series coil 11 of the jamming relay J through the motor armature to line L¹. Closure of contactor switch C⁴ also, by reason of the auxiliary contacts 46 and 47, establishes a circuit through the shunt coil 48 of the jamming relay J which is therefore thus rendered ready for operation or, in other words, is set. The motor is now running at its full speed and under normal conditions will continue to do so.

Let it now be assumed that the motor is subjected to a serious overload. As a consequence of this the current through the series coil 11 of the jamming relay J increases sufficiently to cause the jamming relay to operate and as a further consequence the contacts of this relay separate. This insures interruption of the circuit to the shunt coil of contactor C¹ and it follows from the circuit connections hereinbefore described that all the intermediate switches open and all the steps of resistance are re-inserted in circuit to protect the motor. When the overload passes away the armature of the jamming relay J is released again and its contacts close with the result that the motor again accelerates to top speed in the manner before described.

Referring now particularly to Fig. 2 it will be seen that the jamming relay J is provided with normally closed contacts as before but also has normally open contacts 49 and a voltage relay V is connected across the motor armature so as to be energized from the back electro-motive force of the motor and the other circuit arrangements remaining substantially as before. Thus if an overload occurs the jamming relay J operates, the normally closed contacts 42 are held open, not only by the series ampère turns, but also by the ampère turns on the shunt coil 48 until the back electro-motive force of the motor has died down to a predetermined value. Under this condition the circuit to the shunt coil of the jamming relay J is from line L by conductor 50 through the contacts of the voltage relay V, conductors 51 and 52, contacts 49 and armature of the jamming relay through the shunt coil of the jamming relay J conductors 53 and 8 to line L¹.

In all other respects the arrangement and operation are precisely as before described with reference to Fig. 1.

Referring to Fig. 3 the shunt coil 48 of the jamming relay J is connected across the motor armature and is thus subject to both current and voltage conditions. This obviates the necessity for a separate voltage relay, and the arrangement shown in Fig. 4 illustrates connections whereby the series coil 11 of the jamming relay J is only connected in circuit at the end of the starting period the circuit through this series coil 11 only being completed when the last, C⁴, of the accelerating switches is closed, the circuit to this coil 11 being through the contacts and arm of the switch C⁴ by conductors 55, 56 and 57, through the coil 11, and thence by conductors 58, 59 and 60 to the motor armature. It will be seen that in this case also the shunt coil of the jamming relay J is connected across the motor armature so as to be subject to both current and voltage conditions as before described.

In the further modification shown in Fig. 5 neither the shunt coil 48 nor the series coil 11 of the jamming relay J is connected until the starting has been completed, the circuit of both these coils being dependent upon closure of the last accelerating switch C⁴ which upon response closes the auxiliary contacts 46 and 47 and connects the series coil 11 in the armature circuit and the shunt coil 48 across the armature as will be apparent upon reference to the drawing.

By means of the foregoing invention a jamming relay is provided which will discriminate between starting and running conditions and between normal load and overload conditions during running and moreover "hunting", i. e., too rapid opening and closing of the jamming relay, is prevented by the arrangements hereinbefore described.

What I claim and desire to secure by Letters Patent is:—

1. In a motor controller, in combination, a motor, resistance to be included in the motor circuit in starting and also in running under abnormal conditions and control means for excluding and reinserting said resistance, said means including a jamming relay having cumulative coils respectively connected in series and in shunt to the motor armature whereby said relay is responsive under given conditions to effect insertion of the excluded resistance but ineffective to prevent exclusion of said resistance for acceleration under normal conditions.

2. In motor control systems, in combination with a motor, a jamming relay having two coils acting cumulatively to effect operation of the relay and means for preventing energization of certain of said coils until the motor has been started and accelerated.

3. In motor control systems, in combination with a motor, a jamming relay having two coils acting cumulatively to effect operation of the relay and means for preventing the resetting of said relay after operation until restoration of a substantially normal relation between the motor current and speed.

4. A motor control system comprising in combination with a motor, a jamming relay having both series and shunt coils and a voltage relay connected across the motor armature so as to be subject to the back electro-motive force of the motor, said last mentioned relay being adapted to control said jamming relay under given conditions of the motor circuit.

5. A motor control system comprising in combination with a motor, a jamming relay having two coils which act cumulatively one of said coils being connected in series with the motor armature and the other connected across said motor armature so as to be subject to the back electro-motive force of the motor, and means including a counter-voltage coil for controlling said jamming relay under predetermined electrical conditions.

6. A motor control system comprising a motor, a master controller operable at will to effect starting and acceleration of the motor, an electromagnetic main switch whose coil is energized upon movement of the master controller to its first or starting position said switch upon closure establishing the circuit to the motor, a series relay in the series circuit of the motor, a series of accelerating switches which operate successively to effect acceleration of the motor upon movement of the master controller to accelerating position, a jamming relay having two cumulatively operating coils one of which is a series coil connected in the armature circuit and the other of which is a coil connected in shunt to said armature circuit and means associated with the last of the accelerating switches for establishing circuit to certain of the coils of the jamming relay.

7. A motor control system comprising a motor and accelerating resistance therefor, wherein series lockout switches are employed as accelerating switches and the last accelerating switch is a series lockout switch having a shunt holding coil in addition to its series coils, and means for controlling energization of said coils during the starting period.

8. A motor control system comprising a motor, starting resistance therefor, means for excluding said resistance to effect acceleration of the motor, means for reinserting said resistance upon the occurrence of an abnormal relation between the motor current and speed, and means for rendering said last mentioned means ineffective prior to exclusion of said resistance by said first mentioned means.

9. In a motor control system, in combination, a motor, accelerating resistance therefor, a plurality of series lockout accelerating switches, the last accelerating switch having a shunt holding coil in addition to its series coils, and means for automatically reinserting said resistance under given electrical conditions, said last mentioned means being subject to prior closure of said last accelerating switch.

In witness whereof I affix my signature.

FEDOR BERGMANN.